(12) United States Patent  (10) Patent No.: US 8,274,935 B2
Gidron et al.  (45) Date of Patent: Sep. 25, 2012

(54) MOBILE COMMUNICATION DEVICE NOTIFIER

(75) Inventors: Yoad Gidron, Ramot Menashe (IL); Rafael Ton, Yokneam (IL)

(73) Assignee: Amdocs Software Systems Limited, Dublin (IE)

( * ) Notice: Subject to any disclaimer, the term of this patent is extended or adjusted under 35 U.S.C. 154(b) by 551 days.

(21) Appl. No.: 12/369,009

(22) Filed: Feb. 11, 2009

(65) Prior Publication Data

US 2009/0203403 A1 Aug. 13, 2009

Related U.S. Application Data

(60) Provisional application No. 61/064,014, filed on Feb. 11, 2008.

(51) Int. Cl.
*H04J 3/06* (2006.01)
*H04W 4/00* (2009.01)

(52) U.S. Cl. .......................... 370/329; 370/341; 370/350

(58) Field of Classification Search ........................ None
See application file for complete search history.

(56) References Cited

U.S. PATENT DOCUMENTS

| | | | |
|---|---|---|---|
| 6,477,543 B1 * | 11/2002 | Huang et al. ................... | 707/200 |
| 7,912,186 B2 * | 3/2011 | Howell et al. ............... | 379/88.04 |
| 2005/0136884 A1 * | 6/2005 | Reidelsturz et al. .......... | 455/403 |
| 2005/0138211 A1 * | 6/2005 | Cheng ............................ | 709/250 |
| 2006/0106881 A1 * | 5/2006 | Leung et al. .................. | 707/200 |
| 2007/0198745 A1 * | 8/2007 | Fornari ......................... | 709/248 |
| 2007/0277169 A1 * | 11/2007 | Rao et al. ...................... | 717/173 |
| 2009/0116467 A1 * | 5/2009 | Shi et al. ....................... | 370/338 |
| 2009/0177800 A1 | 7/2009 | Gidron et al. | |
| 2009/0201908 A1 * | 8/2009 | Gidron et al. ................. | 370/350 |
| 2010/0030846 A1 * | 2/2010 | Martin et al. ................. | 709/203 |
| 2010/0049874 A1 * | 2/2010 | Chen et al. ................... | 709/246 |
| 2010/0146072 A1 * | 6/2010 | Friedman et al. ............. | 709/217 |
| 2010/0174974 A1 * | 7/2010 | Brisebois et al. ............. | 715/223 |
| 2010/0279667 A1 * | 11/2010 | Wehrs et al. ............... | 455/414.1 |

* cited by examiner

*Primary Examiner* — Chi Pham
*Assistant Examiner* — Soon-Dong D Hyun
(74) *Attorney, Agent, or Firm* — Zilka-Kotab, PC (57) ABSTRACT

The present invention provides for a system and method for communication between a mobile communication device and an auxiliary processing interface. Remote interfacing with an auxiliary processor enables the provision of services available to a mobile communication device through a more user friendly interface, for example, a larger display for visual ease, a full keyboard for quick and easy typing, or mouse for quick maneuvering. Furthermore, such a service affords the opportunity to remotely use the technology and services available on a mobile communication device remotely, for example in the event that it is misplaced, when traveling or at work.

14 Claims, 4 Drawing Sheets

MOBILE COMMUNICATION DEVICE NOTIFIER

This Application claims priority from U.S. Provisional Application No. 61/064,014, filed on 11 Feb. 2008, hereby incorporated by reference as if fully set forth herein.

FIELD OF THE INVENTION

The present invention relates to a system and a method for providing a user with remote access to existing and/or incoming new data communicated to and associated with a mobile communication device, or at least to an indication of a change in the status of data at the mobile communication device.

BACKGROUND OF THE INVENTION

Digitally enabled mobile communication devices, including cellular telephones, so called "smart phones", Java enabled phones and VoIP telephones (telephones which communicate through the "Voice over IP" protocol, also known as Internet telephones) are all able to communicate with a server. Unlike simple analog telephones, this ability to communicate with a server increases the variety and type of services, which may be offered through such devices.

One type of service that may be offered through digital mobile communication devices is the ability to receive data from a server. For example, if users wish to receive information about a particular contact, such users may receive such information through mobile communication devices connected to a server, which can update their "contact books" or stored information relating to a contact's telephone numbers. Receiving such data from a server may be accomplished by synchronization between a server and the mobile device.

Current data synchronization services that are offered by network operators through protocols as SyncML (Synchronization Markup Language) enable synchronization of contact information and other Personal Information Management (PIM) data (e.g., calendar, notes) between a mobile device and a server. However, a variety of data types may be communicated between the server and mobile communication device based on the synchronization technology. For example data such as media including but not limited to images, audio and video files, and messages including but not limited to SMS (Short Message Service), MMS (Multimedia Messaging Service), e-mails or the like may also be communicated using synchronization technology.

Mobile communication devices can be updated over-the-air with data that is either pushed to the device by network element or pulled by various clients that are installed on the device. Such data includes incoming text and multimedia messages, PIM data, such as calendar events, and content that is downloaded automatically. The distinct advantage of a mobile communication device is its mobility, providing a user to access this data "on the go". However, the limitation of the mobility offered by mobile communication devices is their small interface both in the display and keyboard limitation. Therefore, communication with the mobile communication device interface is not always optimal or comfortable for reading and writing messages, viewing media or the like.

SUMMARY OF THE INVENTION

There is an unmet need for, and it would be highly useful to have, a system and a method for automatically and remotely receiving data received in a mobile communication device to be displayed on an auxiliary, remote processing interface such as a personal computer.

The present invention overcomes these drawbacks of the background art by providing a system and method for indirect data propagation between a mobile communication device and an auxiliary, optionally remote, processing interface. Such communication affords the convenience of potentially remote near real time receipt of data for the user, by remotely transmitting such data to a larger more user friendly interface, for example a PC (personal computer). Remote interfacing with an auxiliary processor affords the user the use of services available with a mobile communication device with a more user-friendly interface, for example, a larger display for visual ease, a full keyboard for quick and easy typing, or mouse for quick maneuvering. Furthermore, such a service affords the opportunity to remotely use the technology and services available on a mobile communication device in the event that it is misplaced, when traveling or at work.

The term "communication" within the context of the description of the instant invention refers to any communication mode for example including, audio, video, visual or written. Optionally communication may be in the form of a voice call, video call, SMS, MMS, email or the like. Optionally, is the channels or technology used for communication optionally include but are not limited to cellular, wireless, landline, optical, RF, IR, Bluetooth or the like.

The term "carrier" within the context of the description of the instant invention refers to a communication service provider that is optionally a mobile, cellular, wireless, landline, optical communication service provider (operator). The "carrier" may optionally be an entity involved in the process of communication, optionally an intermediate entity or an entity that provides a service to the end user, the person using a communication device to communicate.

The terms auxiliary processing unit, auxiliary processing medium, auxiliary interface, additional interface or additional processing medium within the context of the description of the instant invention refers to any auxiliary processing unit comprising an interface, which features a display and keyboard that may be used by a user. For example, an auxiliary processing unit optionally includes but is not limited to a PDA, PC (personal computer), computer, laptop computer, workstation or the like.

The present invention provides a system and method, in some embodiments, for automatically and remotely providing a user with the ability to interact, through an auxiliary processing interface, with data communicated to a mobile communication device, while the mobile communication device is optionally remote from the user and/or otherwise inaccessible by the user.

Remote interfacing according to the system and method of the present invention is preferably provided for a functioning mobile communication device that is equipped with a synchronization client agent able to synchronized with a synchronization server optionally using SyncML (Synchronization Markup Language/aka OMA DS), ActiveSync or other proprietary synchronization protocols, such as mSync as described in U.S. application Ser. No. 12/216,810 filled on Jul. 10, 2008 owned in common with the present application and by one or more of the present inventors, which is hereby incorporated by reference as if fully set forth herein.

Preferably, synchronization server provides a notification regarding the availability of new data, optionally and preferably in near real time, to an auxiliary processing unit, optionally, through an internet or other network connection. The auxiliary device preferably queries the server periodically, about the availability of new data (known as polling method). Optionally, the synchronization server and auxiliary processing unit may communicate with a synchronization agent/client that is associated with an auxiliary device. This auxiliary device is optionally connectable to and removable from another computer, by way of a connector for example including but not limited to male/female connectors, PCMCIA (Personal Computer Memory Card International Association) card, universal serial bus (USB), Bluetooth, optical connection, or the like. The auxiliary device may optionally feature the synchronization agent/client and may optionally provide a user interface for the user to view the new data, preferably through the connected computer.

In some embodiments, the system and method for data synchronization preferably operates through a client installed on the mobile communication device by using one or more of the regular interfaces of the device (including but not limited to phonebook or contacts, gallery and/or SMS or other messaging composition functions). Optionally, a second client may be installed on the auxiliary processing unit and used to communicate with the server. Optionally, the client installed on the mobile communication device and the client installed on the auxiliary may communicate directly by bridging (bypassing) the server. Such direct communication can be implemented, for example and without wishing to be limited by using Bluetooth, by a universal serial bus (USB) connection, a PCMCIA connection, optical connection or the like.

Synchronization optionally and preferably comprises two-way synchronization between the server and the mobile communication device and synchronization between server and auxiliary processing unit. This configuration has many advantages, not the least of which is the ability for synchronization between the mobile communication device and the server without requiring the mobile communication device to be reconfigured. However, synchronization between the mobile communication device and server requires that the mobile communication device be powered or actively functional.

Alternatively, the user is notified through the remote user interface (auxiliary processing unit) and the data, which resides on the server, is optionally accessed through a Web interface.

Upon synchronization, at least one client (preferably at any remote interface from the mobile communication device) and the server preferably exchange information, such as for example updated contact information, received SMS, email, MMS, PIM, reminders, calendar events, information regarding missed calls, voicemail messages which may optionally be translated to text by the server, or the like.

Synchronization between the client and the server may optionally occur periodically, for example according to a pre-determined cycle, or alternatively synchronization may optionally occur upon detection of an event, for example upon receiving an SMS from a mobile carrier or content messaging server, or alternatively triggered by the server through a Communication Initiation Request (CIR).

According to preferred embodiments of the present invention, various types of information may optionally be exchanged through the synchronization process, including but not limited to PIM data, images, video, text, audio, other visual information, messages, or indeed any other type of information may optionally be exchanged between the client/agent and the server.

An optional embodiment of the present invention provides for a system and method for interfacing with a powered mobile communication device through an auxiliary processing unit. Preferably, auxiliary processing unit comprises interfacing facilities optionally including but not limited to a display, keyboard, mouse, a plurality of communication ports, data storage is devices or the like. Preferably, the auxiliary processing unit is equipped with a notifying software application that is optionally running in the background of the processing unit, and preferably activated with a new event or data receipt. Optionally, a new event or data is received with the completion of the synchronization process with the server to reveal new data that originated from the mobile communication device. Optionally and preferably, receipt of new data is indicated in near real time, indicating to a user that new data has been received by the remote mobile communication device. Optionally, the notifying popup display contains a link, shortcut, or other application for redirecting or automatically referring the user to a content interface on the auxiliary processing units' interface for example a display or screen.

Preferably, content interface allows the user to interact with the data using the interface tools available to the auxiliary unit for example, keyboard, mouse, screen communication ports, data ports, connection ports or the like. Optionally, access to the received data requires user authentication and identification, optionally using a login process for example including username, password, captcha or the like as is known and accepted in the art. Optionally and preferably, the application maintains user credentials, so that authentication is required only for the initial registration process and/or initial identification process.

Optionally, the notifying software identifies the new data type and process the link such that once activated it is automatically displayed to the user in a manner appropriate to the received data type, in the appropriate content interface or software.

Optionally the content interface may optionally be in the form of a web browser, or data specific application installed or associated with the auxiliary processing unit, for example including but not limited to text processing application, communication application, calendar application, email application, sync server specific interface application, audio application, video application, or the like. For example, if the data received is associated with a calendar event, address book data, or messages including email, SMS and MMS, the activated application may optionally be Microsoft Outlook®, Lotus Notes®, Mozilla Thunderbird or the like. For example, if audio data is received it may be optionally extracted using an audio or media application available to the auxiliary processing unit. Optionally, if a call is received it may be routed to a VoIP application for example including but not limited to Skype®, or the like. Optionally, if a voicemail is received it may be converted into text. Optionally, the received data may be displayed in content interface using a web browser; optionally the web browser may activate the appropriate plug-in based on the data type received.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "device" on a "wireless network", featuring a "server" and preferably for cellular communication, it should be noted that optionally any device featuring a data processor and/or the ability to execute one or more instructions with the ability to support at least voice communication may be described as a is telephone, including but not limited to any type of telephone enabled computer, a cellular telephone, an IP telephone (software (virtual) device or real (hardware) device), a smart phone, a PDA (personal digital assistant), or a pager. Any two or more of such devices in communication with each other, and/or any computer in communication with a telephone, may optionally comprise a "wireless network", which may (for example) optionally be a computer network and/or a cellular network.

A "server" as termed herein may optionally comprise any computer that is connected to a fixed-line IP network. It should be noted that optionally any device featuring a data processor and/or the ability to execute one or more instructions may be described as a computer, including but not limited to a PC (personal computer), a server, a minicomputer. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of a system and method for a user to interface with an auxiliary processing unit as opposed to a mobile communication device in order to notify the user and to view data received by the mobile communication device. Such data may optionally include any type of messages and/or incoming calls or voice mail messages but may also, additionally or alternatively, optionally relate to any change in the status of data at the mobile communication device, for example relating to receipt of an incoming (missed) call and/or message and/or voice mail message.

The present invention, in some embodiments, is of a system and method for synchronization between a mobile communication device, a server and an auxiliary processing unit, using a client installed on the mobile communication device. Such synchronization optionally and preferably comprises two-way synchronization between the server and the mobile communication device, through the client, such that each of the client and the server may optionally "push" or "pull" information. Preferably, data synchronized between server and mobile communication device is then communicated to an auxiliary processing unit allowing a user to interface with the data on a more user-friendly interface. Optionally and preferably communication between server and auxiliary processing unit is mediated by an internet connection.

Optionally, communication between synchronization server and an auxiliary processing unit may be mediated by way of a synchronization client/agent associated with the auxiliary processing unit. The synchronization client/agent associated with the auxiliary processing unit is optionally the agent/client is preferably removable using a connector for example including but not limited to male-female connector, USB, PMCIA, Bluetooth, optical connector or the like.

Synchronization between an auxiliary processing unit, and the server may optionally occur periodically, for example according to a pre-determined cycle, or alternatively synchronization may optionally occur upon detection of an event, optionally in real time, for example upon receipt of SMS, MMS, email by the mobile communication device. The auxiliary processing unit may also optionally periodically query the server regarding status of new data and/or changes to such data by using a polling method. Communication and synchronization between the server and mobile communication device, or server and auxiliary processing unit, optionally occurs using protocols such as SyncML (aka OMA DS), ActiveSync or other proprietary synchronization protocols, such as mSync as described in U.S. application Ser. No. 12/216,810 filled on Jul. 10, 2008 owned in common with the present application and by one or more of the present inventors, which is hereby incorporated by reference as if fully set forth herein.

Synchronization between the client and the server may optionally occur periodically, for example according to a pre-determined cycle, or alternatively synchronization may optionally occur upon detection of an event, optionally in real time, for example receipt of data for example including but not limited to SMS, MMS, email or the like. Optionally, synchronization may be triggered by the server through a Communication Initiation Request (CIR).

According to preferred embodiments of the present invention, various types of information or content may optionally be exchanged through the synchronization process. For example including but not limited to data, video, audio, text, visual or the like.

The principles and operation of the present invention may be better understood with reference to the drawings and the accompanying description.

Figure 1A:
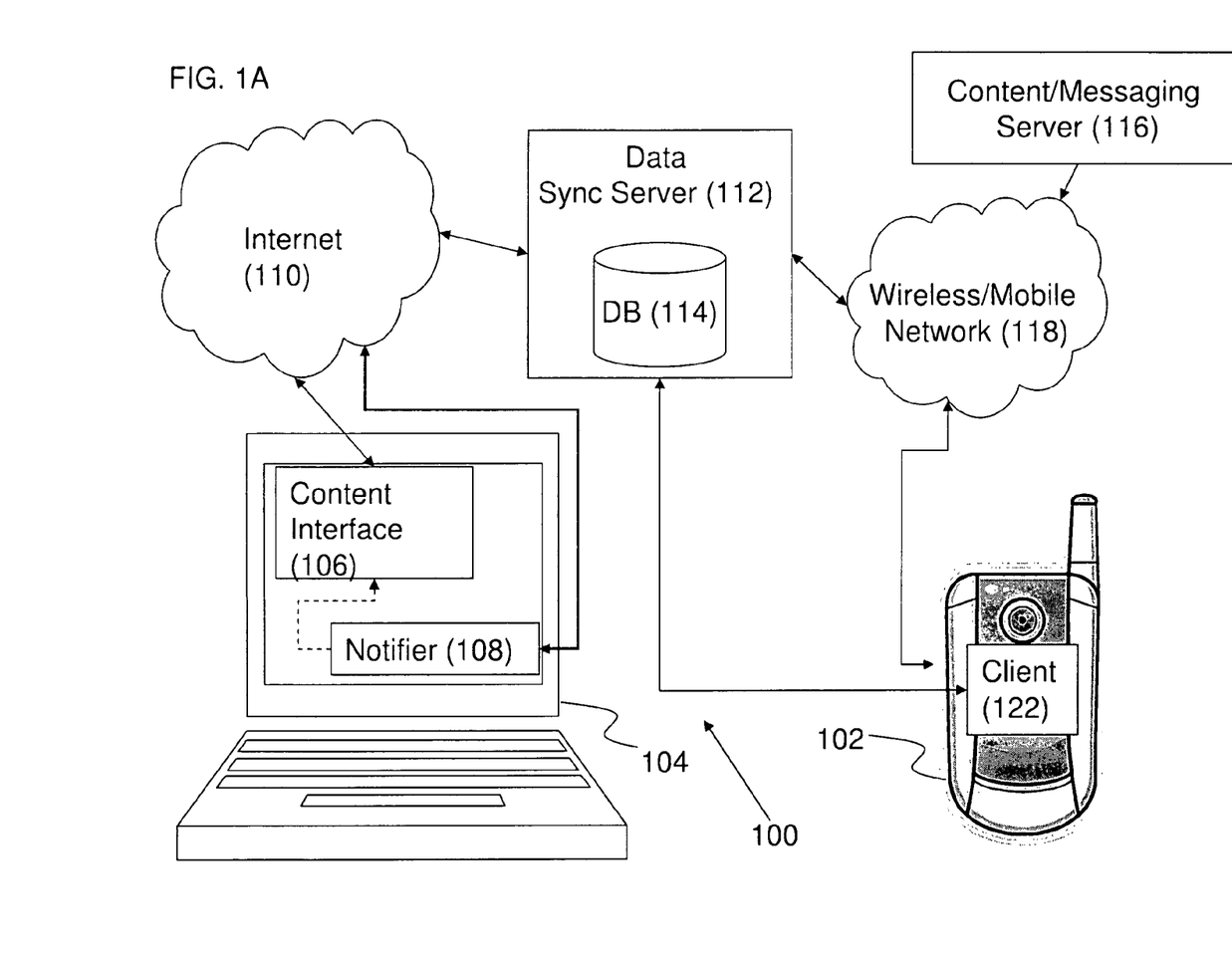
FIG. 1A-B are schematic block diagrams of exemplary systems is according to optional embodiment of the present invention.

Referring now to the drawings, FIG. 1A is a schematic block diagram of an exemplary system 100 according to the present invention for interfacing with mobile communication device 102 that is powered and functional through an auxiliary processing interface 104. System 100 according to the present invention also comprises mobile/wireless network 118, content/messaging server 116, Data Sync Server 112 and Internet network ("cloud") 110. Mobile/wireless network 118 is a cellular and/or mobile and/or wireless network allows the mobile communication device 102 to interact with different voice and data services. Mobile communication device 102 preferably comprises client 122.

Preferably, mobile/wireless network 118 transmits data, for example including a phone call (voice communication), SMS (short message service) message, email, MMS (multimedia messaging service) message, calendar event or the like, that is to be routed to mobile communication device 102. For example, wireless/mobile network 118 may receive data from content messaging server 116; optionally, wireless/mobile network 118 may receive data to route to mobile communication device 102 from any server, communication device or the like according to method and technology that is known and accepted in the art.

Wireless/mobile Network 118 routes received data to mobile communication device 102 according to communication protocols accepted and known in the art. Preferably mobile communication device 102 comprises a sync client 122 that communicates with sync server 112 and relays data or events received from mobile carrier 118 to sync server 112. Sync server 112 may optionally be located in the IP network of mobile carrier 118 or anywhere in the internet or other network (not shown). More preferably, client 122 automatically identifies new data through local events in the device and relays them to sync server 112 optionally using SyncML, or the like synchronization data communication protocols. Optionally, data received by sync server 112 is stored in database 114.

Preferably, synchronization between sync client 122 and sync server 112 may be optionally triggered by a new incoming event, new content received, based on a set schedule, or as scheduled by the server. Preferably, when the synchronization process is completed, the sync server 112 has a stored copy, optionally in database 114 implemented as a relational database and/or file system, or any other storage system, of the most up-to-date data that exists on the phone for example including but not limited to PIM (contacts, calendar, tasks), media (video, audio, images) and messages (SMS, MMS), or the like.

Optionally and preferably, sync server 112 may then relay the received data to auxiliary processing interface 104, for example including but not limited to a computer, PDA or the like for more convenient interfacing. Auxiliary processing interface 104 is preferably authenticated through the use of a user name/password and/or other identifiers. Mobile communication device 102 is preferably identified by MSISDN (Mobile Subscriber Integrated Services Digital Network Number, which uniquely identifies a subscribing device in a GSM (Global System for Mobile communications, or Groupe Spécial Mobile) or UMTS (Universal Mobile Telecommunications System) mobile network; there are known protocols for providing this number to an external device or network via integration with the operator network, or other methods, depending on the synchronization protocol and the network configuration; any suitable method preferably uniquely identifies the communicating or subscribing device and could easily be selected by one of ordinary skill in the art. Optionally, communication between sync server 112 to auxiliary processing interface 104 is mediated via internet communication using an internet network cloud 110. Sync server 112 communicates through internet network cloud 110, using communication protocols known and accepted in the art for example including HTTP or any other communication protocol used for mark-up language documents, or the like, that is used to relay the event or data to auxiliary processing interface 104. Optionally and preferably, auxiliary processing interface 104 communicates directly with sync server 112 through HTTP.

Preferably, auxiliary processing interface 104 comprises notifying software application running in the background that displays a notifying popup display 108 indicating to a user that new data has been received. Optionally, the notifying popup display 108 contains a link, or other applications for redirecting or automatically referring the user to a content interface 106 where the received data is accessed. Optionally, access to the received data requires user authentication and identification, optionally using a login process for example including username, password, captcha or the like as is known and accepted in the art.

Preferably, content interface 106 allows the user to interact with, view, respond to, or edit the received data, in a manner appropriate to the received data type. Content interface 106 may optionally be in the form of a web browser, word processing application, communication application, calendar application, email application, sync server specific interface application, audio application, video application, or the like. For example, if the data received is associated with a calendar event, address book data, or messages like email, MMS and SMS, the activated application may optionally be Microsoft Outlook®, Lotus Notes® or the like. For example, if audio data is received it may be optionally extracted using an audio or media application available to the auxiliary processing interface 104. Optionally, the received data may be displayed in content interface 106 using a web browser; optionally the web browser may activate the appropriate plug-in based on the data type received.

Figure 1B:
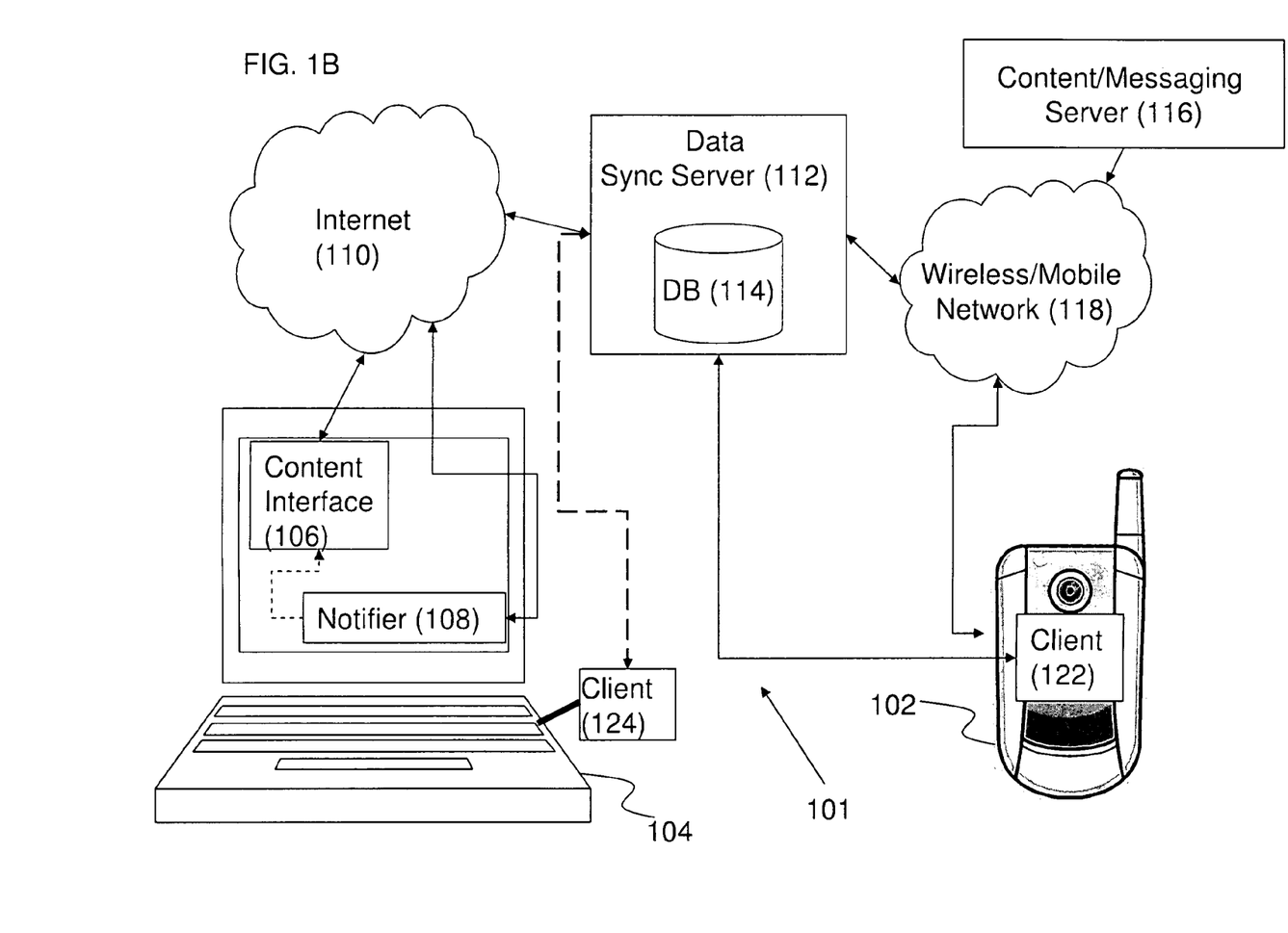

FIG. 1B depicts an optional system 101 according to the present invention that functions similarly to system 100 of FIG. 1A, however the communication between auxiliary processing interface 104, for example including but not limited to a computer, PDA or the like, and Sync server 112, is preferably mediated by a Sync Client 124 that is associated with the auxiliary processing interface 104. Sync client 124 is preferably an agent, is able to synchronize with a synchronization server optionally using SyncML (Synchronization Markup Language/aka OMA DS), ActiveSync or other proprietary synchronization protocols, Sync client 124 is associated with auxiliary processing interface 104, optionally by accepted wired or wireless connections, for example including but not limited to universal serial bus connection (USB), PCMCIA connection, Bluetooth, optical ports, or the like. Optionally, sync client 124 associated with auxiliary processing interface 104 is a parallel client to sync client 122 associated with mobile communication device 102. Preferably, both sync clients 122 and 124 communicate directly with sync server 112, facilitating communication between mobile communication device 102 and auxiliary processing interface 104. Both sync clients 122 and 124 synchronize data between the mobile communication device 102 and auxiliary processing interface 104. As a result, each change that is made in one device is propagated to the other devices through the server.

Figure 2:
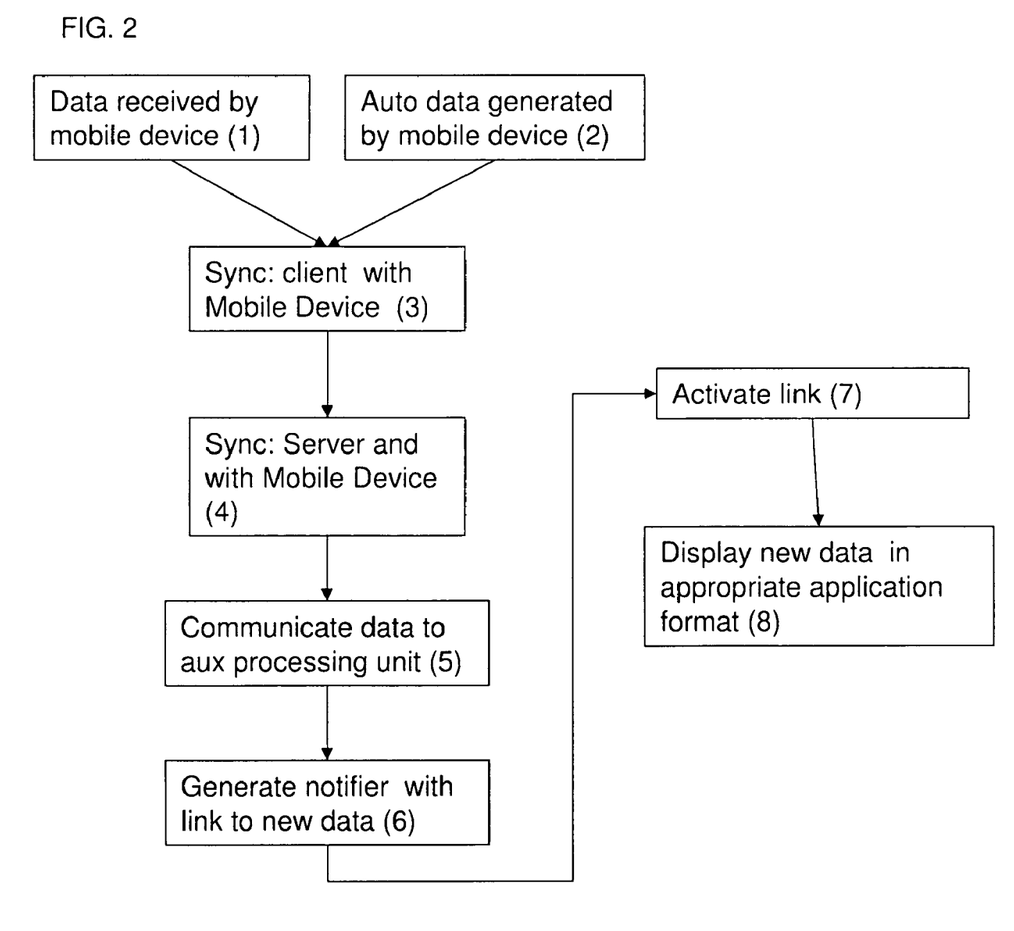
FIG. 2 is an exemplary method according to the present invention for remote interfacing of data received in a mobile communication device on an auxiliary interface.

FIG. 2 shows a flowchart of an exemplary method according to the present invention, where data received by a mobile communication device is communicated to an auxiliary processing unit through a sync server allowing a user to interface with the mobile phone through an auxiliary device.

In stage 1 data is received by mobile communication device as an example of a change of status of data at the device; for example an SMS is received. In stage 2 the mobile communication device self generates data, for example an event reminder, as another example of a change of status of data at the device. In stage 3 the data generated or received in stages 1 and/or 2 respectively, is synchronized with a sync client associated with the mobile communication device (optionally only one of stages 1 or 2 occurs). During the synchronization process between mobile communication device and the sync client, preferably at least most (but more preferably all) data associated with the mobile communication device is preferably updated, including incoming new data established in stage 1.

In stage 4 synchronization between sync client and sync server occurs optionally using SyncML (OMA DS), although any synchronization process could optionally be used. During stage 4 the data associated with the mobile communication device optionally including PIM (contacts, calendar, tasks), media (video, audio, images) and messages (SMS, MMS) or the like is stored in the server to be communicated to the auxiliary processor. In stage 5, new data is communicated to the auxiliary processor, for example a computer. The auxiliary processor may optionally initiate communication with the Sync server in order to pull data from the sync server. Initiating communication is preferably done by the Notifier application, which queries the server for new or modified data that belongs to the user. Optionally communication may be facilitated through an internet connection using markup language, or via direct wireless, optical, IR, RF, SW communication protocols known and accepted in the art. Optionally, communication between the auxiliary processor and server may be mediated with the user of a sync server associated with the auxiliary processor. Optionally, communication initiated by the auxiliary processor is preformed on a frequency schedule base to obtain data.

In stage 6, the data communicated to the auxiliary processor preferably generates a display such as a popup for example, that directs the user to a location where the data is accessible; more preferably, the popup comprises a link, shortcut or the like address identification and/or connection to direct the user to access the received data. Once the link is activated in stage 7, the data is made accessible to the user in stage 8. Gaining access to the data in stage 8 optionally and preferably requires a user authentication or a mechanism for identification, optionally by using a login process, for example including but not limited to a username, password, or captcha. Preferably, the data displayed is made available in a plurality of formats optionally based on the type of data communicated. Optionally, the data may be displayed using an internet browser or individual local software associated with the auxiliary processor. For example, an incoming SMS is optionally displayed in a text displaying software, while an MMS is optionally displayed using an appropriate multimedia software associated with the auxiliary processors. Optionally, data displayed using a web browser mediated through an internet connection will be appropriately displayed by automatic activation of the appropriate plug-in associated with the data being displayed.

Figure 3:
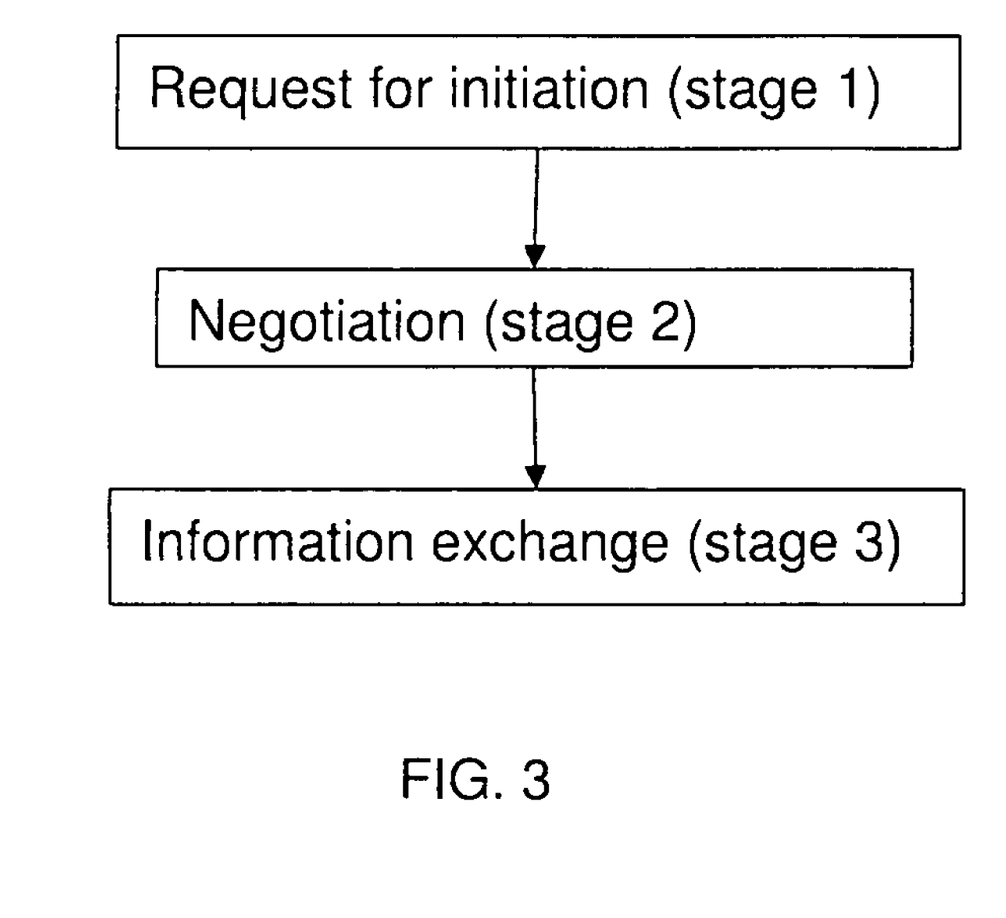
FIG. 3 is an exemplary synchronization process between the server and the mobile communication device or server and auxiliary processing unit.

FIG. 3 is an exemplary synchronization process between the server and the mobile communication device or server and auxiliary processing unit. The protocol enables bidirectional synchronization of data between a client and a server. The client is optionally either the mobile communication device or the auxiliary processing unit. In stage 1, the client and/or the server send a request to the other party for starting a session. In stage 2, a negotiation for starting a session is performed, preferably through a handshake process. Such a negotiation can be initiated by the client (by for example using a timer) or by the server (by for example a user request or a scheduler). During the negotiation process, the server authenticates the client. In stage 3, the client and the server optionally exchange information in order to detect changes that were made in the device and in the server since last sync. The client sends to the server all the data elements that were added, changed or deleted in the device since last sync. The server sends to the client all the data elements that were added, changed or deleted in the server since last sync. At the end of the synchronization process, the server preferably has an up-to-date copy of all relevant data item that exist on the device (e.g., contacts, calendar events, messages, etc.)

While the invention has been described with respect to a limited number of embodiments, it will be appreciated that many variations, modifications and other applications of the invention may be made.

What is claimed is:

1. A system, comprising:
    a server including a processor for remotely accessing data of a mobile communication device, where the data is transmitted from the mobile communication device to the server during a synchronization; and
    a client for accessing the data of the mobile communication device, where the data is transmitted from the server to the client during the synchronization;
    wherein the synchronization occurs upon receipt of one or more of a short message service (SMS) message, a multimedia messaging service (MMS) message, and an email by the mobile communication device.

2. The system of claim 1 wherein the client includes an auxiliary processing interface.

3. The system of claim 2 wherein the auxiliary processing interface includes a PC (personal computer), a personal digital assistant (PDA), a laptop computer, or a desktop computer.

4. The system of claim 2 wherein communication to the auxiliary processing interface is mediated by an internet connection.

5. The system of claim 2 wherein communication to the auxiliary processing interface is mediated by a synchronization client and a synchronization agent associated with the auxiliary processing interface.

6. The system of claim 1, wherein the system is operable such that a notifying popup display is presented at the client in response to the server transmitting the data of the mobile communication device to the client, where the notifying popup display indicates to a user that the data has been received.

7. The system of claim 6, wherein the notifying popup display includes a link for redirecting the user to a content interface where the received data is accessed.

8. The system of claim 7, wherein the content interface includes a web browser.

9. A method, comprising:
    rendering a mobile communication device accessible; and
    providing remote access to data of the mobile communication device;
    wherein providing the remote access comprises synchronizing data between the mobile communication device and a client, utilizing a server;
    wherein the synchronization occurs upon receipt of one or more of a short message service (SMS) message, a multimedia messaging service (MMS) message, and an email by the mobile communication device.

10. The method of claim 9, wherein the rendering the mobile communication device accessible comprises activating the mobile communication device.

11. The method of claim 9, wherein the synchronization is implemented using SyncML (Synchronization Markup Language), ActiveSync or another proprietary synchronization protocol.

12. The method of claim 9 wherein the access to the data requires user authentication and identification.

13. A method, comprising:
   rendering a mobile communication device accessible;
   detecting a change to the mobile communication device, utilizing a server; and
   notifying a client of the change by synchronizing data between the client and the mobile communication device, utilizing the server;
   wherein the synchronization occurs upon receipt of one or more of a short message service (SMS) message, a multimedia messaging service (MMS) message, and an email by the mobile communication device.

14. The method of claim 13, wherein the notification of the change is performed immediately after the detecting.

* * * * *